United States Patent
Lv et al.

(10) Patent No.: US 11,038,608 B2
(45) Date of Patent: Jun. 15, 2021

(54) FREQUENCY SYNCHRONIZATION METHOD AND SLAVE CLOCK

(71) Applicant: Huawei Technologies Co., Ltd., Shenzhen (CN)

(72) Inventors: Jingfei Lv, Wuhan (CN); Jinhui Wang, Dongguan (CN); Chuan Xu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 32 days.

(21) Appl. No.: 16/401,996

(22) Filed: May 2, 2019

(65) Prior Publication Data

US 2019/0260490 A1    Aug. 22, 2019

Related U.S. Application Data

(63) Continuation of application No. PCT/CN2017/109377, filed on Nov. 3, 2017.

(30) Foreign Application Priority Data

Nov. 4, 2016  (CN) .......................... 201610978432.9

(51) Int. Cl.
*H04J 3/06* (2006.01)

(52) U.S. Cl.
CPC ............ *H04J 3/0667* (2013.01); *H04J 3/067* (2013.01)

(58) Field of Classification Search
CPC .. G06F 1/10; G06F 1/12; H04J 3/0635; H04J 3/0638; H04J 3/0641; H04J 3/0644;
(Continued)

(56) References Cited

U.S. PATENT DOCUMENTS 6,396,888 B1* 5/2002 Notani .................. H03L 7/0891
                                                     375/364
6,539,489 B1* 3/2003 Reinert ..................... G06F 1/14
                                                     713/400
(Continued)

FOREIGN PATENT DOCUMENTS

CN    101039145 A    9/2007
CN    102013970 A    4/2011
(Continued)

OTHER PUBLICATIONS

Lv et al., An Enhanced IEEE 1588 Time Synchronization for Asymmetric Communication Link in Packet Transport Network, Aug. 2010, IEEE Communications Letters, vol. 14, No. 8 (Year: 2010).*

(Continued)

*Primary Examiner* — Eric Nowlin
(74) *Attorney, Agent, or Firm* — Slater Matsil, LLP

(57) ABSTRACT

A frequency synchronization method includes: receiving, by a slave clock, a first pulse signal and a second pulse signal; determining, by the slave clock based on a first phase difference, a second phase difference, a first delay, and a second delay, that a frequency offset of the slave clock relative to the master clock is equal to a first frequency offset, where the first phase difference is a difference between a phase of a third pulse signal generated by the slave clock and a phase of the first pulse signal received by the slave clock, and the second phase difference is a difference between a phase of a fourth pulse signal generated by the slave clock and a phase of the second pulse signal received by the slave clock; and calibrating, by the slave clock, frequency of the slave clock based on the first frequency offset.

20 Claims, 3 Drawing Sheets

(58) Field of Classification Search
CPC ...... H04J 3/0652; H04J 3/0655; H04J 3/0658; H04J 3/0661; H04J 3/0667; H04J 3/067; H04J 3/0673; H04J 3/0682; H04J 3/0697; H04L 7/0008; H04L 7/0012; H04L 7/0033; H04L 7/0037; H04L 7/04; H04L 43/0852; H04W 56/00; H04W 56/005; H04W 84/20

See application file for complete search history.

(56) References Cited

U.S. PATENT DOCUMENTS

| | | | | |
|---|---|---|---|---|
| 6,647,052 B2* | 11/2003 | Hailey | H04B 15/00 | 375/130 |
| 6,839,393 B1* | 1/2005 | Sidiropoulos | G06F 1/10 | 375/371 |
| 7,126,937 B2* | 10/2006 | Crosbie | H04B 7/269 | 370/350 |
| 7,719,315 B2* | 5/2010 | Ngo | G01R 31/318552 | 326/93 |
| 7,876,791 B2* | 1/2011 | Jung | H04J 3/0667 | 370/503 |
| 8,018,972 B2* | 9/2011 | Roberts | H04L 41/12 | 370/507 |
| 8,050,373 B2* | 11/2011 | Buchwald | H04L 25/20 | 375/356 |
| 8,161,313 B2* | 4/2012 | Oh | G06F 1/08 | 713/503 |
| 8,181,056 B2* | 5/2012 | Oh | G06F 13/1689 | 713/401 |
| 8,340,686 B2* | 12/2012 | Bartlett | G01S 5/0284 | 455/456.1 |
| 8,370,676 B2* | 2/2013 | Matsunaga | H04J 3/0667 | 713/400 |
| 8,432,851 B2* | 4/2013 | Xu | H04L 27/2688 | 370/324 |
| 8,543,005 B2* | 9/2013 | Binkert | G06F 1/105 | 398/155 |
| 8,693,608 B2* | 4/2014 | Hadzic | H04J 3/0667 | 375/376 |
| 8,731,036 B2* | 5/2014 | Umayabashi | H03L 7/08 | 375/224 |
| 8,750,335 B2* | 6/2014 | Webb, III | H04L 43/0852 | 370/516 |
| 8,817,823 B2* | 8/2014 | Shen | H04J 14/0201 | 370/503 |
| 8,866,633 B2* | 10/2014 | Montgomery | G01V 13/00 | 340/855.4 |
| 8,913,632 B2* | 12/2014 | Aweya | H03L 7/0994 | 370/503 |
| 8,995,473 B2* | 3/2015 | Zheng | H04J 3/0667 | 370/516 |
| 9,001,952 B2* | 4/2015 | Sanders | G06F 13/4278 | 375/371 |
| 9,007,989 B2* | 4/2015 | Xu | H04L 27/2682 | 370/324 |
| 9,024,600 B2* | 5/2015 | Wiktor | H02M 3/157 | 323/272 |
| 9,059,811 B2* | 6/2015 | Huang | H04J 3/0682 | |
| 9,112,631 B2* | 8/2015 | Aweya | H04J 3/0673 | |
| 9,178,637 B2* | 11/2015 | Aweya | H04J 3/0602 | |
| 9,225,344 B2* | 12/2015 | Jones | G06F 1/10 | |
| 9,276,591 B2* | 3/2016 | Hadzic | H03L 7/087 | |
| 9,292,036 B2* | 3/2016 | Grocutt | G06F 1/12 | |
| 9,471,090 B2* | 10/2016 | Kindred | H04W 56/0015 | |
| 9,491,728 B2* | 11/2016 | Wen | H04W 56/004 | |
| 9,531,395 B2* | 12/2016 | Aweya | H04J 3/0697 | |
| 9,571,266 B1* | 2/2017 | Aweya | H04J 3/0667 | |
| 9,690,674 B2* | 6/2017 | Cui | H04J 3/0641 | |
| 9,954,669 B2* | 4/2018 | Perez-Cruz | G01S 5/0081 | |
| 10,117,203 B2* | 10/2018 | Kindred | H04R 25/554 | |
| 10,284,414 B2* | 5/2019 | Chaloupka | H04L 69/28 | |
| 10,411,986 B2* | 9/2019 | Mihelic | H04W 56/00 | |
| 10,608,764 B2* | 3/2020 | Chaloupka | H04J 3/0667 | |
| 10,674,465 B2* | 6/2020 | Kindred | H04J 3/0664 | |
| 10,680,623 B2* | 6/2020 | Buliga | H03L 7/093 | |
| 2002/0093590 A1* | 7/2002 | Hodgkiss | H04N 5/073 | 348/500 |
| 2002/0114303 A1* | 8/2002 | Crosbie | H04B 7/269 | 370/338 |
| 2003/0118080 A1* | 6/2003 | Hailey | H04B 15/00 | 375/130 |
| 2006/0267640 A1* | 11/2006 | Travis | H03L 7/10 | 327/105 |
| 2008/0101522 A1* | 5/2008 | Ngo | G01R 31/318552 | 375/372 |
| 2009/0013114 A1* | 1/2009 | Sanders | G06F 13/4278 | 710/110 |
| 2009/0121792 A1* | 5/2009 | Travis | H04L 7/0331 | 331/2 |
| 2010/0020909 A1* | 1/2010 | Jung | H04J 3/0667 | 375/371 |
| 2010/0083027 A1* | 4/2010 | Oh | G06F 13/1689 | 713/601 |
| 2010/0083028 A1* | 4/2010 | Oh | G06F 1/08 | 713/601 |
| 2010/0150288 A1* | 6/2010 | Zhu | H04J 3/0658 | 375/356 |
| 2010/0158181 A1* | 6/2010 | Hadzic | H03L 7/087 | 375/371 |
| 2010/0250781 A1* | 9/2010 | Matsunaga | H04L 1/205 | 709/248 |
| 2011/0052204 A1* | 3/2011 | Binkert | G06F 1/105 | 398/141 |
| 2011/0075685 A1* | 3/2011 | Xu | H04L 27/2672 | 370/503 |
| 2011/0156820 A1* | 6/2011 | Travis | H03L 7/0995 | 331/18 |
| 2011/0228834 A1* | 9/2011 | Umayabashi | H03L 7/08 | 375/224 |
| 2011/0280299 A1* | 11/2011 | O'Malley | H03K 7/08 | 375/238 |
| 2012/0069944 A1* | 3/2012 | Hadzic | H04L 7/033 | 375/376 |
| 2012/0122485 A1* | 5/2012 | Bartlett | G01S 5/0284 | 455/456.1 |
| 2012/0185722 A1* | 7/2012 | Sanders | G06F 13/4278 | 713/503 |
| 2012/0221881 A1* | 8/2012 | Webb, III | H04L 47/10 | 713/400 |
| 2013/0034197 A1* | 2/2013 | Aweya | H03L 7/0991 | 375/362 |
| 2013/0223577 A1* | 8/2013 | Xu | H04L 27/2672 | 375/354 |
| 2013/0279525 A1* | 10/2013 | Zheng | H04J 3/0667 | 370/516 |
| 2013/0308660 A1* | 11/2013 | Huang | H04J 3/0682 | 370/518 |
| 2014/0068315 A1* | 3/2014 | Aweya | G06F 1/14 | 713/503 |
| 2014/0097818 A1* | 4/2014 | Wiktor | H02M 3/156 | 323/283 |
| 2014/0143582 A1* | 5/2014 | Kindred | H04R 25/554 | 713/400 |
| 2014/0198810 A1* | 7/2014 | Jones | G06F 1/10 | 370/507 |
| 2014/0351359 A1* | 11/2014 | Grocutt | G06F 13/4282 | 709/209 |
| 2015/0071309 A1* | 3/2015 | Aweya | H04J 3/0682 | 370/503 |
| 2015/0092793 A1 | 4/2015 | Aweya | | |
| 2015/0092796 A1* | 4/2015 | Aweya | H04J 3/0667 | 370/516 |
| 2015/0092797 A1* | 4/2015 | Aweya | H04J 3/0667 | 370/516 |
| 2015/0127978 A1* | 5/2015 | Cui | H04J 3/0641 | 714/15 |
| 2015/0163000 A1* | 6/2015 | Aweya | H04L 7/033 | 370/519 |

(56) References Cited

U.S. PATENT DOCUMENTS

| | | | |
|---|---|---|---|
| 2016/0094335 A1 | 3/2016 | Roberts et al. | |
| 2016/0170437 A1 | 6/2016 | Aweya | |
| 2016/0182067 A1 | 6/2016 | Liu | |
| 2016/0182219 A1 | 6/2016 | Taylor | |
| 2017/0099644 A1* | 4/2017 | Kindred | G06F 1/12 |
| 2017/0195109 A1* | 7/2017 | Perez-Cruz | G01S 5/02 |
| 2017/0195980 A1* | 7/2017 | Aggarwal | H04W 56/007 |
| 2017/0359210 A1* | 12/2017 | Chaloupka | H04L 69/28 |
| 2018/0026735 A1* | 1/2018 | Chen | H04J 3/0667 370/350 |
| 2018/0048457 A1* | 2/2018 | Dzung | H04J 3/0667 |
| 2018/0145781 A1* | 5/2018 | Chaloupka | H04J 3/0667 |
| 2018/0145863 A1* | 5/2018 | Chaloupka | H04L 67/42 |
| 2018/0198598 A1 | 7/2018 | Mihelic | |
| 2019/0036631 A1* | 1/2019 | Markovic | H04J 3/0697 |
| 2019/0036804 A1* | 1/2019 | Mihelic | H04L 27/2657 |
| 2019/0132812 A1* | 5/2019 | Kindred | G06F 1/12 |
| 2019/0260490 A1* | 8/2019 | Lv | H04J 3/067 |
| 2019/0319631 A1* | 10/2019 | Buliga | H03L 7/085 |
| 2019/0356466 A1* | 11/2019 | Kratz | H04W 56/0065 |
| 2020/0007424 A1* | 1/2020 | Mihelic | H04L 27/2657 |
| 2020/0045661 A1* | 2/2020 | Verso | H04W 56/0015 |
| 2020/0195363 A1* | 6/2020 | Wang | H04J 3/0667 |

FOREIGN PATENT DOCUMENTS

| | | | | |
|---|---|---|---|---|
| CN | 102130883 A | | 7/2011 | |
| CN | 102769504 A | | 11/2012 | |
| CN | 103814338 A | | 5/2014 | |
| CN | 103888237 A | | 6/2014 | |
| CN | 104365043 A | * | 2/2015 | H04J 3/0667 |
| CN | 105790874 B | * | 3/2018 | |
| CN | 108474834 A | * | 8/2018 | G01S 5/14 |
| EP | 1139202 A2 | * | 10/2001 | G06F 1/14 |
| EP | 2712100 A1 | * | 3/2014 | H04L 43/0847 |
| EP | 2839596 A1 | * | 2/2015 | H04J 3/0667 |
| EP | 3400455 A1 | * | 11/2018 | H04L 7/0008 |
| EP | 3053286 B1 | * | 7/2019 | H04J 3/0667 |
| JP | WO2010058831 A1 | * | 4/2012 | H04J 3/0664 |
| JP | 5440880 B2 | * | 3/2014 | H03L 7/08 |
| KR | 20160072347 A | | 6/2016 | |
| WO | WO-2010058831 A1 | * | 5/2010 | H03L 7/08 |
| WO | WO-2013156904 A1 | * | 10/2013 | H04J 3/0667 |
| WO | 2015049478 A1 | | 4/2015 | |
| WO | WO-2017120366 A1 | * | 7/2017 | G01S 5/0221 |

OTHER PUBLICATIONS

Exel, Mitigation of Asymmetric Link Delays in IEEE 1588 Clock Synchronization Systems, Mar. 2014, IEEE Communications Letters, vol. 18, No. 3 (Year: 2014).*

Lam et al., An Improved Precision Time Protocol for Industrial WLAN Communication Systems, Mar. 14, 2016, 2016 IEEE International Conference on Industrial Technology (ICIT), pp. 824-829, doi: 10.1109/ICIT.2016.7474858. (Year: 2016).*

Lee, An Enhanced IEEE 1588 Time Synchronization Algorithm for Asymmetric Communication Link using Block Burst Transmission , Sep. 2008, IEEE Communications Letters, vol. 12, No. 9 (Year: 2008).*

Zhao et al., The implementation of IEEE 1588 clock synchronization system based on FPGA, Aug. 18, 2014, Fifth International Conference on Intelligent Control and Information Processing, pp. 216-220, doi: 10.1109/ICICIP.2014.7010342 (Year: 2014).*

Qing et al., IEEE 1588 and a Dynamic Delay Correction Clock Synchronization Algorithm, Apr. 13, 2020, 2019 IEEE 5th International Conference on Computer and Communications (ICCC), pp. 442-446, doi: 10.1109/ICCC47050.2019.9064350 (Year: 2020).*

Shan et al., Research on High Precision Master-slave Clock Synchronization Based on 1588 Protocol, Jul. 12, 2019, 2019 IEEE 9th International Conference on Electronics Information and Emergency Communication (ICEIEC), pp. 1-5, doi: 10.1109/ICEIEC. 2019.8784647 (Year: 2016).*

Rahman et al., Delay Asymmetry Correction Model for Master-Slave Synchronization Protocols, May 13, 2014, 2014 IEEE 28th International Conference on Advanced Information Networking and Applications, pp. 1-8, doi: 10.1109/AINA.2014.8 (Year: 2014).*

Aliaga, Ramon et al., "PET System Synchronization and Timing Resolution Using High-Speed Data Links", IEEE Transactions on Nuclear Science, IEEE Service Center, New York, NY, US, vol. 58, No. 4, Aug. 1, 2011, pp. 1596-1605, XP011373129.

IEEE, "IEEE Standard for a Precision Clock Synchronization Protocol for Networked Measurement and Control Systems," IEEE Instrumentation and Measurement Society, IEEE Std 1588™-2008, Jul. 24, 2008, 289 pages.

Mills, D.L., "Network Time Protocol (Version 3) Specification, Implementation and Analysis," RFC 1305, Mar. 1992, 120 pages.

* cited by examiner

FREQUENCY SYNCHRONIZATION METHOD AND SLAVE CLOCK

CROSS-REFERENCE TO RELATED APPLICATIONS

This application is a continuation of International Application No. PCT/CN2017/109377, filed on Nov. 3, 2017, which claims priority to Chinese Patent Application No. 201610978432.9, filed on Nov. 4, 2016. The disclosures of the aforementioned applications are hereby incorporated by reference in their entireties.

TECHNICAL FIELD

Embodiments of the present application relate to the field of electronic technologies, and in particular, to a frequency synchronization method and a slave clock.

BACKGROUND

Before two network devices communicate with each other, each network device needs to calibrate a local clock of the network device. For example, before two routers communicate with each other, each router needs to calibrate a time and frequency of a local clock of the router. When a network device calibrates a local clock of the network device with reference to an external clock, a role of the network device is a slave clock, and a role of the external clock referenced by the network device is a master clock. Before the slave clock calibrates frequency of the slave clock, the slave clock may first determine a frequency offset of the slave clock relative to the master clock. The frequency offset determined by the slave clock is not accurate enough, and consequently frequency synchronization precision is relatively low.

SUMMARY

Embodiments provide a frequency synchronization method and a slave clock, helping improve frequency synchronization precision.

According to a first aspect, a frequency synchronization method is provided. The method includes receiving, by a slave clock, a first pulse signal and a second pulse signal, where the second pulse signal is sent by a master clock after the master clock sends the first pulse signal. The method also includes determining, by the slave clock based on a first phase difference, a second phase difference, a first delay, and a second delay, that a frequency offset of the slave clock relative to the master clock is equal to a first frequency offset, where the first phase difference is a difference between a phase of a third pulse signal generated by the slave clock and a phase of the first pulse signal received by the slave clock, the third pulse signal is generated by the slave clock when the slave clock receives the first pulse signal, the second phase difference is a difference between a phase of a fourth pulse signal generated by the slave clock and a phase of the second pulse signal received by the slave clock, the fourth pulse signal is generated by the slave clock when the slave clock receives the second pulse signal, the first delay is a delay that is determined by the slave clock when the slave clock receives the first pulse signal and that is of a link between the master clock and the slave lock, the first delay is determined by the slave clock based on packets exchanged between the master clock and the slave clock, the second delay is a delay that is determined by the slave clock when the slave clock receives the second pulse signal and that is of the link between the master clock and the slave clock, the second delay is determined by the slave clock based on packets exchanged between the master clock and the slave clock, and the first delay is unequal to the second delay. The method also includes calibrating, by the slave clock, frequency of the slave clock based on the first frequency offset.

Optionally, before the determining, by the slave clock based on a first phase difference, a second phase difference, a first delay, and a second delay, that a frequency offset of the slave clock relative to the master clock is equal to a first frequency offset, the method further includes: determining, by the slave clock, the first delay and the second delay based on the following formulas:

$$\text{Delay} = \frac{(t2 - t1) + (t4 - t3)}{2}, \text{ and } \text{Delay}' = \frac{(t2' - t1') + (t4' - t3')}{2};$$

where
t1 is a time at which the master clock sends a first packet, t2 is a time at which the slave clock receives the first packet, t3 is a time at which the slave clock sends a second packet, t4 is a time at which the master clock receives the second packet, the packets that are used by the slave clock to determine the first delay and exchanged between the master clock and the slave clock include the first packet and the second packet, t1' is a time at which the master clock sends a third packet, t2' is a time at which the slave clock receives the third packet, t3' is a time at which the slave clock sends a fourth packet, t4' is a time at which the master clock receives the fourth packet, Delay is the first delay, Delay' is the second delay, and the packets that are used by the slave clock to determine the second delay and exchanged between the master clock and the slave clock include the third packet and the fourth packet.

Optionally, the determining, by the slave clock based on a first phase difference, a second phase difference, a first delay, and a second delay, that a frequency offset of the slave clock relative to the master clock is equal to a first frequency offset includes: determining, by the slave clock, the first frequency offset based on the following formula:

$$\text{FreqOffset} = \frac{(PD - \text{Delay}) - (PD' - \text{Delay}')}{Ts},$$

where
PD is the first phase difference, PD' is the second phase difference, Ts is a difference between a time at which the slave clock receives the first pulse signal and a time at which the slave clock receives the second pulse signal, and FreqOffset is the first frequency offset.

Optionally, the third pulse signal is generated by the slave clock after the slave clock receives the first pulse signal, and the fourth pulse signal is generated by the slave clock after the slave clock receives the second pulse signal.

Optionally, the third pulse signal is generated by the slave clock before the slave clock receives the first pulse signal, and the fourth pulse signal is generated by the slave clock before the slave clock receives the second pulse signal.

Optionally, the first packet is a synchronization (Sync) message, and the second packet is a delay request (Delay_req) message.

Optionally, the first packet is a Network Time Protocol (NTP) response packet, and the second packet is an NTP request packet.

According to a second aspect, a slave clock is provided. The slave clock includes a receiving unit, configured to receive a first pulse signal and a second pulse signal, where the second pulse signal is sent by a master clock after the master clock sends the first pulse signal. The slave clock also includes a first determining unit, configured to determine, based on a first phase difference, a second phase difference, a first delay, and a second delay, that a frequency offset of the slave clock relative to the master clock is equal to a first frequency offset, where the first phase difference is a difference between a phase of a third pulse signal generated by the slave clock and a phase of the first pulse signal received by the slave clock, the third pulse signal is generated by the slave clock when the slave clock receives the first pulse signal, the second phase difference is a difference between a phase of a fourth pulse signal generated by the slave clock and a phase of the second pulse signal received by the slave clock, the fourth pulse signal is generated by the slave clock when the slave clock receives the second pulse signal, the first delay is a delay that is determined by the slave clock when the slave clock receives the first pulse signal and that is of a link between the master clock and the slave clock, the first delay is determined by the slave clock based on packets exchanged between the master clock and the slave clock, the second delay is a delay that is determined by the slave clock when the slave clock receives the second pulse signal and that is of the link between the master clock and the slave clock, the second delay is determined by the slave clock based on packets exchanged between the master clock and the slave clock, and the first delay is unequal to the second delay. The slave clock also includes a calibration unit, configured to calibrate frequency of the slave clock based on the first frequency offset determined by the first determining unit.

According to the second aspect, in a first possible implementation of the second aspect, the slave clock further includes a second determining unit, where the second determining unit is configured to: before the first determining unit determines that the frequency offset of the slave clock relative to the master clock is equal to the first frequency offset, determine the first delay and the second delay based on the following formulas:

$$\text{Delay} = \frac{(t2 - t1) + (t4 - t3)}{2}, \text{ and } \text{Delay}' = \frac{(t2' - t1') + (t4' - t3')}{2};$$

where t1 is a time at which the master clock sends a first packet, t2 is a time at which the slave clock receives the first packet, t3 is a time at which the slave clock sends a second packet, t4 is a time at which the master clock receives the second packet, the packets that are used by the slave clock to determine the first delay and exchanged between the master clock and the slave clock include the first packet and the second packet, t1' is a time at which the master clock sends a third packet, t2' is a time at which the slave clock receives the third packet, t3' is a time at which the slave clock sends a fourth packet, t4' is a time at which the master clock receives the fourth packet, Delay is the first delay, Delay' is the second delay, and the packets that are used by the slave clock to determine the second delay and exchanged between the master clock and the slave clock include the third packet and the fourth packet.

Optionally, the first determining unit is configured to determine the first frequency offset based on the following formula:

$$FreqOffset = \frac{(PD - \text{Delay}) - (PD' - \text{Delay}')}{Ts},$$

where

PD is the first phase difference, PD' is the second phase difference, Ts is a difference between a time at which the slave clock receives the first pulse signal and a time at which the slave clock receives the second pulse signal, and FreqOffset is the first frequency offset.

Optionally, the third pulse signal is generated by the slave clock after the slave clock receives the first pulse signal, and the fourth pulse signal is generated by the slave clock after the slave clock receives the second pulse signal.

Optionally, the third pulse signal is generated by the slave clock before the slave clock receives the first pulse signal, and the fourth pulse signal is generated by the slave clock before the slave clock receives the second pulse signal.

Optionally, the first packet is a synchronization (Sync) message, and the second packet is a delay request (Delay_req) message.

Optionally, the first packet is a Network Time Protocol (NTP) response packet, and the second packet is an NTP request packet.

According to a third aspect, a time synchronization system is provided. The time synchronization system includes a master clock and the slave clock according to the second aspect or any possible implementation of the second aspect.

According to a fourth aspect, a slave clock is provided. The slave clock may perform the method according to the first aspect or any possible implementation of the first aspect.

In the foregoing technical solutions, when the slave clock determines the frequency offset relative to the master clock, a change in the delay of the link between the master clock and the slave clock is considered. The slave clock determines, based on the first phase difference, the second phase difference, the first delay, and the second delay, that the frequency offset of the slave clock relative to the master clock is equal to the first frequency offset. The first delay is the delay that is determined by the slave clock when the slave clock receives the first pulse signal and that is of the link between the master clock and the slave clock. The second delay is the delay that is determined by the slave clock when the slave clock receives the second pulse signal and that is of the link between the master clock and the slave clock. The first delay is unequal to the second delay. Therefore, the foregoing technical solutions help reduce an error in the frequency offset determined by the slave clock. Further, the foregoing solutions help improve frequency synchronization precision.

BRIEF DESCRIPTION OF THE DRAWINGS

To describe the technical solutions in the embodiments of the present application more clearly, the following briefly describes the accompanying drawings required for describing the embodiments. Apparently, the accompanying drawings in the following description merely show some embodiments of the present application, and a person of ordinary skill in the art can derive other drawings from these accompanying drawings without creative efforts.

DETAILED DESCRIPTION OF ILLUSTRATIVE EMBODIMENTS

Figure 1:
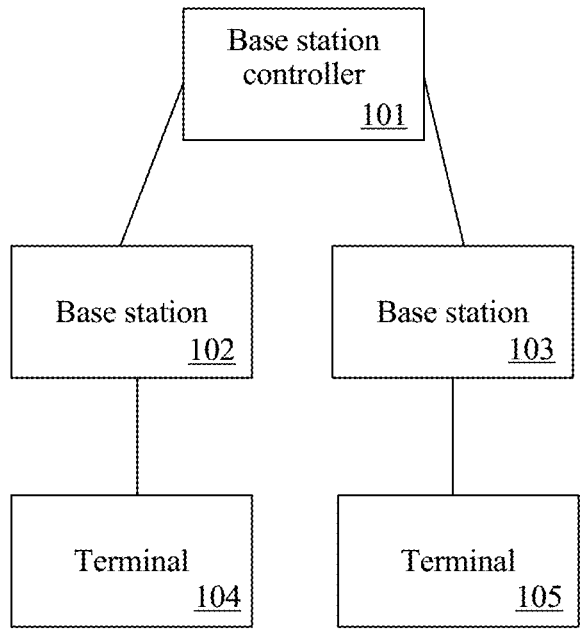
FIG. 1 is a schematic diagram of a network according to an embodiment.

To make the purpose, technical solutions, and advantages of the embodiments of the present application clearer, the following describes the technical solutions of the embodiments of the present application with reference to the accompanying drawings in the embodiments of the present application. Apparently, the described embodiments are a part rather than all of the embodiments of the present application. Other embodiments obtained by a person of ordinary skill in the art based on the embodiments of the present application without creative efforts shall fall within the protection scope of the present application.

In this application, that "a delay of a link changes" means that delays of transmitting different pulse signals on the link are unequal. That "a delay of a link does not change" means that delays of transmitting different pulse signals on the link are equal.

In this application, a synchronization (Sync) message, a delay request (Delay_Req) message, and a delay response (Delay_Resp) message are messages defined in the Precision Time Protocol (PTP). The PTP may be the IEEE 1588-2008 formulated by the Institute of Electrical and Electronics Engineers (IEEE).

When a slave clock performs frequency synchronization based on information provided by a master clock, the slave clock may determine a frequency offset of the slave clock relative to the master clock. A change in a delay of a link between the master clock and the slave clock may reduce accuracy of the frequency offset that is calculated by the slave clock and that is of the slave clock relative to the master clock. In other words, if the slave clock does not consider an error caused by the change in the delay of the link between the master clock and the slave clock, the frequency offset calculated by the slave clock may be inaccurate. Further, frequency synchronization precision of the slave clock is reduced.

The master clock separately sends a pulse signal 1 and a pulse signal 2 to the slave clock. The pulse signal 1 arrives at the slave clock through the link between the master clock and the slave clock. A transmission delay of the pulse signal 1 on the link is $\Delta t1$. The pulse signal 2 arrives at the slave clock through the link between the master clock and the slave clock. A transmission delay of the pulse signal 2 on the link is $\Delta t2$. When the slave clock receives the pulse signal 1, the slave clock determines a difference PD1 between a phase of the received pulse signal 1 and a phase of a pulse signal 3 generated by the slave clock. When the slave clock receives the pulse signal 2, the slave clock determines a difference PD2 between a phase of the received pulse signal 2 and a phase of a pulse signal 4 generated by the slave clock. Further, the slave clock determines a frequency offset between the master clock and the slave clock based on PD1 and PD2.

In the foregoing technical solution, the frequency offset determined by the slave clock based on PD1 and PD2 may be imprecise. In other words, there is an error between the frequency offset determined by the slave clock based on PD1 and PD2 and the frequency offset between the master clock and the slave clock. The error is caused because a change in a link delay of a pulse signal is not considered. If link delays of different pulse signals are equal, the frequency offset calculated by the slave clock based on PD1 and PD2 has no offset. In an actual scenario, a link delay of a pulse signal may be affected by temperature, pressure, or another physical factor. When the physical factor changes, the link delay also changes. When a link delay of the pulse signal 1 is unequal to a link delay of the pulse signal 2, the frequency offset calculated by the slave clock based on PD1 and PD2 has an offset.

When the link delay delay 1 of the pulse signal 1 is unequal to the link delay delay 2 of the pulse signal 2, the frequency offset calculated by the slave clock based on PD1 and PD2 is affected by the fact that delay 1 is unequal to delay 2. Assuming that the slave clock can obtain delay 1 and delay 2, a frequency offset calculated by the slave clock based on PD1' and PD2' is precise. PD1' is equal to PD1 minus delay 1. PD2' is equal to PD2 minus delay 2.

FIG. 1 is a schematic diagram of a network. The network may be a Global System for Mobile Communications (GSM) network. The network shown in FIG. 1 includes a base station controller 101, a base station 102, a base station 103, a terminal 104, and a terminal 105. The terminal 104 is in a cell managed by the base station 102. The terminal 105 is in a cell managed by the base station 103. The terminal 104 and the terminal 105 may be mobile phones conforming to GSM. When the terminal 104 wants to make a call with the terminal 105, the terminal 104 may initiate paging to the terminal 105 by using the base station 102, the base station controller 101, and the base station 103.

The base station controller 101 may include a global positioning system (GPS) receiver and a clock. A GPS satellite (not shown in the figure) may perform time synchronization processing on the base station controller 101. The GPS satellite may include an atomic clock. The GPS satellite may send a GPS signal to the base station controller 101 under drive of the atomic clock. The GPS signal may include extremely accurate time data. After receiving the GPS signal, the GPS receiver in the base station controller 101 may synchronize a clock in the base station controller 101 with the atomic clock in the GPS satellite based on the time data in the GPS signal. A time of the clock in the base station controller 101 is synchronized with a time of the atomic clock in the GPS satellite. In addition, frequency of the clock in the base station controller 101 is synchronized with frequency of the atomic clock in the GPS satellite. In the foregoing process, a role of the GPS satellite is a master clock, and a role of the base station controller 101 is a slave clock.

In addition, the base station controller 101 may further perform clock synchronization processing on the base station 102 or the base station 103. That the base station controller 101 performs clock synchronization processing on the base station 102 is used as an example below for description. For example, the clock in the base station controller 101 is a device conforming to the IEEE 1588-

2008. A clock included in the base station 102 is also a device conforming to IEEE 1588-2008. The base station controller 101 may perform clock synchronization processing on the base station 102 based on the stipulation in the IEEE 1588-2008. For example, the base station controller 101 sends a Sync message to the base station 102. The base station 102 sends a Delay_Req message to the base station controller 101. The base station controller tot sends a Delay_Resp message to the base station 102. The base station 102 may calibrate the clock of the base station 102 based on a timestamp obtained in the foregoing interaction process. The base station 102 may calibrate a time of the clock of the base station 102, and calibrate frequency of the clock of the base station 102. In the foregoing process, a role of the base station controller tot is a master clock, and a role of the base station 102 is a slave clock.

Figure 2:
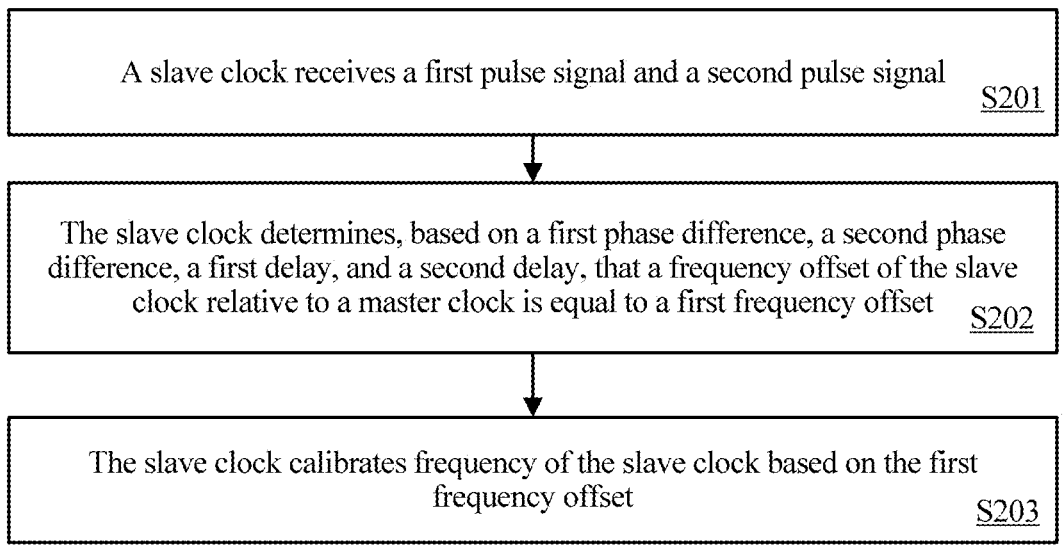
FIG. 2 is a schematic diagram of a method according to an embodiment.
Figure 3:
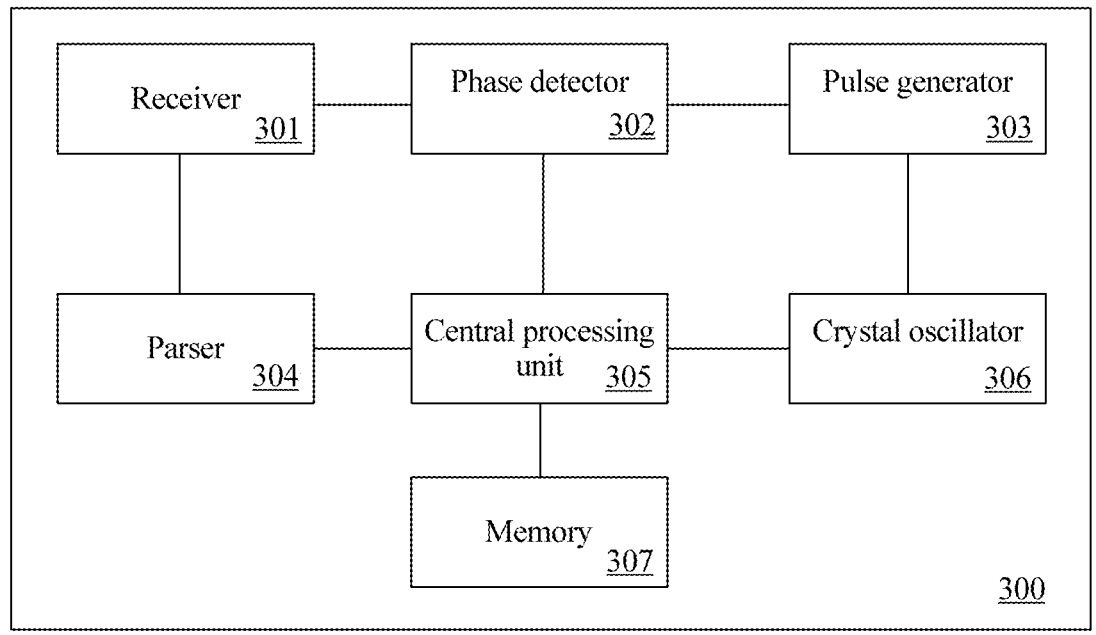
FIG. 3 is a schematic structural diagram of a slave clock according to an embodiment.

FIG. 2 is a schematic diagram of a method according to an embodiment of the present application. Referring to FIG. 2, the method includes S201, S202, and S203. FIG. 3 is a schematic structural diagram of a slave clock according to an embodiment of the present application. For example, a slave clock 300 shown in FIG. 3 may be configured to perform the method shown in FIG. 2. In addition, the method shown in FIG. 2 may be applied to the network shown in FIG. 1.

S201. A slave clock receives a first pulse signal and a second pulse signal.

The second pulse signal is sent by a master clock after the master clock sends the first pulse signal.

For example, both the master clock and the slave clock may be network devices. A specific implementation of the master clock is described below. For a specific implementation of the slave clock, refer to the specific implementation of the master clock. The master clock may be a router, a switch, a base station controller, or a base station. The router may include a network processor, a switched network chip, and a traffic management chip. The switch may include a network processor, a switched network chip, and a traffic management chip. The base station may include a baseband chip and a radio frequency chip. The base station controller may include a central processing unit.

The master clock includes a clock generator. The clock generator may be implemented by using a crystal oscillator. For example, the clock generator may be a single-phase clock, a two-phase clock, or a four-phase clock. The clock generator may generate a clock signal. The clock signal may be in a form of a square wave. The clock signal may be used for an action of coordinating a digital circuit. For example, when the master clock is a router or a switch, the clock signal may be used to drive a network processor, a switched network chip, and a traffic management chip in the master clock. When the master clock is a base station, the clock signal may be used to drive a baseband chip and a radio frequency chip in the master clock. When the master clock is a base station controller, the clock signal may be used to drive a central processing unit in the master clock. The clock signal may include a plurality of pulse signals. For example, the plurality of pulse signals may be a plurality of electrical signals or a plurality of optical signals. When the master clock is a router or a switch, the master clock may send the plurality of electrical signals to the slave clock by using an Ethernet interface. Alternatively, the master clock may send the plurality of optical signals to the slave clock by using an optical module. The plurality of pulse signals includes the first pulse signal and the second pulse signal. The master clock may first send the first pulse signal, and then, send the second pulse signal.

A specific implementation of S201 is described below by using the slave clock 300 shown in FIG. 3 as an example. Referring to FIG. 3, the slave clock 300 includes a receiver 301, a phase detector 302, a pulse generator 303, a parser 304, a central processing unit 305, and a crystal oscillator 306. The receiver 301 is coupled to the phase detector 302. The pulse generator 303 is coupled to the phase detector 302. The receiver 301 is coupled to the parser 304. The parser 304 is coupled to the central processing unit 305. The central processing unit 305 is coupled to the crystal oscillator 306. The slave clock 300 may perform S201 by using the receiver 301. The slave clock 300 may receive the first pulse signal and the second pulse signal by using the receiver 301.

An application scenario of S201 is described below by using FIG. 2 as an example. For example, the base station controller 101 in FIG. 1 may be configured to implement the master clock in the method shown in FIG. 2. The base station 102 in FIG. 1 may be configured to implement the slave clock in the method shown in FIG. 2. The base station 102 may receive the first pulse signal and the second pulse signal from the base station controller 101.

S202. The slave clock determines, based on a first phase difference, a second phase difference, a first delay, and a second delay, that a frequency offset of the slave clock relative to the master clock is equal to a first frequency offset.

The first phase difference is a difference between a phase of a third pulse signal generated by the slave clock and a phase of the first pulse signal received by the slave clock, the third pulse signal is generated by the slave clock when the slave clock receives the first pulse signal, the second phase difference is a difference between a phase of a fourth pulse signal generated by the slave clock and a phase of the second pulse signal received by the slave clock, the fourth pulse signal is generated by the slave clock when the slave clock receives the second pulse signal, the first delay is a delay that is determined by the slave clock when the slave clock receives the first pulse signal and that is of a link between the master clock and the slave clock, the first delay is determined by the slave clock based on packets exchanged between the master clock and the slave clock, the second delay is a delay that is determined by the slave clock when the slave clock receives the second pulse signal and that is of the link between the master clock and the slave clock, the second delay is determined by the slave clock based on packets exchanged between the master clock and the slave clock, and the first delay is unequal to the second delay.

A specific implementation of S202 is described below by using the slave clock 300 shown in FIG. 3 as an example. The slave clock 300 may be configured to perform S202. The central processing unit 305 may be configured to perform S202.

The slave clock 300 includes the pulse generator 303. The pulse generator 303 may be implemented by using a shaper or a comparator. For example, the crystal oscillator 306 may send a sine wave to the pulse generator 303. After receiving the sine wave, the pulse generator 303 may convert the sine wave into a square wave. The square wave generated by the pulse generator 303 may include a plurality of pulse signals. The square wave generated by the pulse generator 303 may be used as a clock signal used to drive a digital circuit in the slave clock 300. For a specific implementation in which the clock signal generated by the slave clock 300 drives the digital circuit in the slave clock 300, refer to the description in the foregoing description that the clock signal generated by the master clock drives the digital circuit in the master clock, and details are not described herein again.

The clock signal generated by the pulse generator 303 includes the third pulse signal and the fourth pulse signal. The pulse generator 303 may first generate the third pulse signal, and then, generate the fourth pulse signal.

The slave clock 300 may include the phase detector 302. The phase detector 302 may be configured to determine the first phase difference and the second phase difference. The phase detector 302 may include a pulse detector. The pulse detector is configured to detect pulse signals from the master clock, for example, the first pulse signal and the second pulse signal. For example, the phase detector 302 may receive the first pulse signal and the second pulse signal by using a receiving port connected to the receiver 301. The pulse detector may be further configured to detect pulse signals generated by the slave clock, for example, the third pulse signal and the fourth pulse signal. For example, the phase detector 302 may receive the third pulse signal and the fourth pulse signal by using a receiving port connected to the pulse generator 303. The phase detector 302 may determine the first phase difference based on the detected first pulse signal and third pulse signal. The phase detector 302 may further determine the second phase difference based on the detected second pulse signal and fourth pulse signal. After determining the first phase difference and the second phase difference, the phase detector 302 may send the first phase difference and the second phase difference to the central processing unit 305. The central processing unit 305 may store the first phase difference and the second phase difference into a register in the central processing unit 305.

The slave clock 300 may generate the third pulse signal when receiving the first pulse signal. For example, the pulse generator 303 may generate the third pulse signal before the receiver 301 receives the first pulse signal. Alternatively, the pulse generator 303 may generate the third pulse signal after the receiver 301 receives the first pulse signal. The slave clock 300 may generate the fourth pulse signal when receiving the second pulse signal. For example, the pulse generator 303 may generate the fourth pulse signal before the receiver 301 receives the second pulse signal. Alternatively, the pulse generator 303 may generate the fourth pulse signal after the receiver 301 receives the second pulse signal.

The first delay is the delay that is determined by the slave clock and that is of the link between the master clock and the slave clock. The second delay is the delay that is determined by the slave clock and that is of the link between the master clock and the slave clock. The delay of the link between the master clock and the slave clock may be duration of transmitting a signal generated by the master clock from the master clock to the slave clock. Due to an environment change, duration of transmitting signals generated by the master clock at different times from the master clock to the slave clock may be unequal. For example, the master clock generates a signal 1 at a time t1 (for example, 12 o'clock at noon), and generates a signal 2 at a time t2 (for example, 5 o'clock am). A delay of the signal 1 is d1. A delay of the signal 2 is d2. Temperature of an environment of the link between the master clock and the slave clock at the time t1 may be higher than temperature of an environment of the link between the master clock and the slave clock at the time t2. Consequently, d1 may be unequal to d2.

A process in which the slave clock determines the delay is described below by way of example with reference to FIG. 3. Before the slave clock 300 receives the first pulse signal, the slave clock 300 may determine the first delay based on the packets exchanged between the slave clock 300 and the master clock. The slave clock 300 may determine the first delay based on the PTP. For example, the slave clock 300 may determine the first delay based on the IEEE 1588-2008. For a specific implementation of a manner of determining the first delay, refer to the following descriptions: A Sync message sent by the master clock to the slave clock 300 may carry a timestamp 1, and the timestamp 1 is used to indicate a time at which the master clock sends the Sync message. For example, after receiving the Sync message, the receiver 301 may forward the Sync message to the parser 304. The parser 304 may parse the Sync message, to obtain the timestamp 1. When receiving the Sync message, the slave clock 300 may generate a timestamp 2 based on a time of receiving the Sync message. The timestamp 2 is used to indicate a time at which the slave clock 300 receives the Sync message. The slave clock 300 sends a Delay_Req message to the master clock. The Delay_Req message carries a timestamp 3. The timestamp 3 is used to indicate a time at which the slave clock 300 receives the Delay_Req message. The master clock sends a Delay_Resp message to the slave clock 300. The Delay_Resp message carries a timestamp 4. The timestamp 4 is used to indicate a time at which the master clock receives the Delay_Req message. The slave clock 300 may determine the first delay based on the timestamp 1, the timestamp 2, the timestamp 3, and the timestamp 4. For example, the central processing unit 305 may determine the first delay based on the timestamp 1, the timestamp 2, the timestamp 3, and the timestamp 4. For example, the first delay is equal to a half of (Timestamp 2−Timestamp 1+Timestamp 4−Timestamp 3). The central processing unit 305 may store the first delay into the register in the central processing unit 305 after determining the first delay.

Before the slave clock 300 receives the second pulse signal, the slave clock 300 may determine the second delay based on the packets exchanged between the slave clock 300 and the master clock. For a specific implementation of a manner of determining the second delay, refer to the descriptions of the manner of determining the first delay in the foregoing specification, and details are not described herein again. After determining the second delay, the slave clock 300 may store the second delay into the register in the slave clock 300.

An arithmetic logical unit in the central processing unit 305 may obtain the first delay, the second delay, the first phase difference, and the second phase difference by accessing the register in the central processing unit 305. Then, the arithmetic logical unit in the central processing unit 305 may calculate the frequency offset, to be specific, the first frequency offset, of the slave clock 300 relative to the master clock based on the first delay, the second delay, the first phase difference, and the second phase difference.

For example, the packets exchanged between the slave clock 300 and the master clock are packets defined in the Network Time Protocol (NTP). The slave clock 300 may determine the first delay based on the NTP. For the NTP, refer to the request for comments (RFC) 5905 released by the Internet Engineering Task Force (IETF). The second packet may be an NTP request packet. The first packet may be an NTP response packet.

The slave clock 300 may be a Network Time Protocol client (NTP client) defined in the NTP. The master clock may be a server (server) defined in the NTP. The NTP client sends a request packet (request packet) to the server. The request packet is sent at a time $t_0$. The server receives the request packet. The request packet is received at a time $t_1$. The server sends a response packet (response packet) to the NTP client. The response packet is sent at a time $t_2$. The NTP client receives the response packet. The response packet is received at a time $t_3$.

The NTP client may calculate a round-trip delay based on a formula round-trip delay=$(t_3-t_0)-(t_2-t_1)$. Further, the NTP client may determine the first delay based on the round-trip delay. The first delay is a half of the round-trip delay. For a specific implementation of a manner of determining the second delay, refer to the descriptions of the manner of determining the first delay in the foregoing specification, and details are not described herein again.

An application scenario of S202 is described below by using FIG. 2 as an example. For example, the base station controller 101 in FIG. 1 may be configured to implement the master clock in the method shown in FIG. 2. The base station 102 in FIG. 1 may be configured to implement the slave clock in the method shown in FIG. 2. The base station 102 may receive the first pulse signal and the second pulse signal from the base station controller 101. In addition, the base station 102 may interact with the base station controller 101 according to the IEEE 1588-2008, to determine the first delay and the second delay. The base station 102 may calculate a frequency offset, to be specific, the first frequency offset, of the base station 102 relative to the base station controller 101 based on the first delay, the second delay, the first phase difference, and the second phase difference.

S203. The slave clock calibrates frequency of the slave clock based on the first frequency offset.

For example, the slave clock 300 may include a voltage source. An output voltage of the voltage source acts on the crystal oscillator 306. A higher output voltage of the voltage source indicates higher working frequency of the crystal oscillator 306. The central processing unit 305 may calibrate the frequency of the slave clock 300 by using an output voltage of a voltage source of the controller.

For example, the central processing unit 305 may determine a voltage adjustment value 1 based on the first frequency offset. A memory 307 may store a correspondence between a frequency offset and a voltage adjustment value. The central processing unit 305 may search the correspondence for a voltage adjustment value, to be specific, the voltage adjustment value 1, corresponding to the first frequency offset by accessing the memory 307. Before the central processing unit 305 determines the voltage adjustment value 1, the output voltage of the voltage source is a voltage value 1. After determining the voltage adjustment value 1, the central processing unit 305 may adjust the output voltage of the voltage source to a voltage value 2 based on the voltage adjustment value 1. The voltage value 2 is equal to a sum of the voltage value 1 and the voltage adjustment value 1. Therefore, if the voltage adjustment value 1 is a positive number, it means that frequency of the slave clock 300 is lower than frequency of the master clock, and the central processing unit 305 may calibrate the frequency of the slave clock 300 by improving the working frequency of the crystal oscillator 306. If the voltage adjustment value 1 is a negative number, it means that frequency of the slave clock 300 is higher than frequency of the master clock, and the central processing unit 305 may calibrate the frequency of the slave clock 300 by reducing the working frequency of the crystal oscillator 306.

In the foregoing technical solution, the crystal oscillator 306 may be replaced with a direct digital synthesizer (DDS). In other words, the DDS may also be configured to generate a pulse. In addition, before the central processing unit 305 performs S203, working frequency of the DDS may be working frequency 1. During specific implementation of S203, the central processing unit 305 may adjust the working frequency of the DDS to working frequency 2. The working frequency 2 is equal to a sum of the working frequency 1 and the first frequency offset.

In the solution shown in FIG. 2, when the slave clock determines the frequency offset relative to the master clock, a change in the delay of the link between the master clock and the slave clock is considered. The slave clock determines, based on the first phase difference, the second phase difference, the first delay, and the second delay, that the frequency offset of the slave clock relative to the master clock is equal to the first frequency offset. The first delay is the delay that is determined by the slave clock when the slave clock receives the first pulse signal and that is of the link between the master clock and the slave clock. The second delay is the delay that is determined by the slave clock when the slave clock receives the second pulse signal and that is of the link between the master clock and the slave clock. The first delay is unequal to the second delay. Therefore, the foregoing technical solution helps reduce an error in the frequency offset determined by the slave clock. Further, the foregoing solution helps improve frequency synchronization precision.

Optionally, in the foregoing technical solution, before S202, the method may further include: determining, by the slave clock, the first delay and the second delay based on the following formulas:

$$\text{Delay} = \frac{(t2-t1)+(t4-t3)}{2}, \text{ and } \text{Delay}' = \frac{(t2'-t1')+(t4'-t3')}{2};$$

where t1 is a time at which the master clock sends the first packet, t2 is a time at which the slave clock receives the first packet, t3 is a time at which the slave clock sends the second packet, t4 is a time at which the master clock receives the second packet, the packets that are used by the slave clock to determine the first delay and exchanged between the master clock and the slave clock include the first packet and the second packet, t1' is a time at which the master clock sends a third packet, t2' is a time at which the slave clock receives the third packet, t3' is a time at which the slave clock sends a fourth packet, t4' is a time at which the master clock receives the fourth packet, Delay is the first delay, Delay' is the second delay, and the packets that are used by the slave clock to determine the second delay and exchanged between the master clock and the slave clock include the third packet and the fourth packet.

Figure 6:
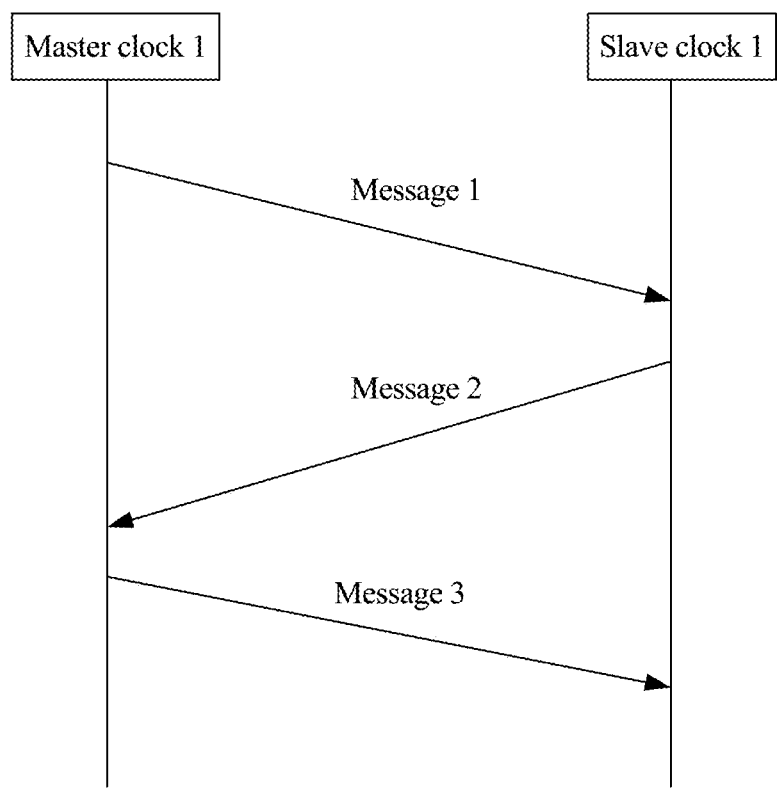
FIG. 6 is a schematic diagram showing that a master clock and a slave clock exchange packets according to an embodiment.

FIG. 6 is a schematic diagram showing that the master clock and the slave clock exchange packets. According to a solution shown in FIG. 6, the slave clock can obtain parameters required for determining the first delay and the second delay.

Referring to FIG. 6, entities that exchange packets are a master clock 1 and a slave clock 1. Packets exchanged between the master clock 1 and the slave clock 1 include a message 1, a message 2, and a message 3. The master clock 1 is configured to implement the master clock in the method shown in FIG. 2. The slave clock 1 is configured to implement the slave clock in the method shown in FIG. 2. The message 1 is used to implement the first packet. The message 2 is used to implement the second packet. The master clock 1 sends the message 1 to the slave clock 1. After receiving the message 1, the slave clock sends the message 2 to the master clock. After receiving the message 2, the master clock 1 sends the message 3 to the slave clock 1. The master clock 1 and the slave clock 1 may support functions defined in the IEEE 1588-2008. The message 1 may be a synchronization message (Sync message). The synchronization message may carry t1. A time at which the synchronization message arrives at the slave clock is t2. The message 2 may be a delay request message (Delay_Req message). The delay request message may carry t3. A time at which the delay request message arrives at the master clock 1 is t4. The message 3 may be a delay response message (Delay_Resp message). The delay response message may carry t4. By using the foregoing packet exchange, the slave clock may obtain parameters, to be specific, t1, t2, t3, and t4, required for determining the first delay. Certainly, the master clock 1 and the slave clock 1 may exchange other packets with reference to the packet exchange process shown in FIG. 6. For example, the master clock 1 sends a message 1' to the slave clock 1. The slave clock 1 sends a message 2' to the master clock 1. The master clock 1 sends a message 3' to the slave clock 1. The message 1' may be a synchronization message. The message 2' may be a delay request message. The message 3' may be a delay response message. By using the foregoing process, the slave clock may obtain parameters, to be specific, t1', t2', t3', and t4', required for determining the second delay.

Optionally, in the foregoing technical solution, S202 may include: determining, by the slave clock, the first frequency offset based on the following formula:

$$FreqOffset = \frac{(PD - \text{Delay}) - (PD' - \text{Delay}')}{Ts},$$

where

PD is the first phase difference, PD' is the second phase difference, Ts is a difference between a time at which the slave clock receives the first pulse signal and a time at which the slave clock receives the second pulse signal, and FreqOffset is the first frequency offset.

Optionally, in the foregoing technical solution, the third pulse signal is generated by the slave clock after the slave clock receives the first pulse signal, and the fourth pulse signal is generated by the slave clock after the slave clock receives the second pulse signal.

Optionally, in the foregoing technical solution, the third pulse signal is generated by the slave clock before the slave clock receives the first pulse signal, and the fourth pulse signal is generated by the slave clock before the slave clock receives the second pulse signal.

Optionally, in the foregoing technical solution, the first packet is a synchronization message, and the second packet is a delay request message.

Optionally, in the foregoing technical solution, the first packet is an NTP response packet, and the second packet is an NTP request packet.

Figure 4:
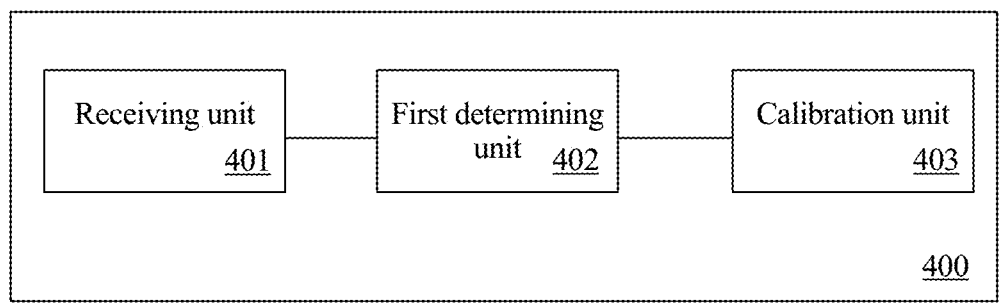
FIG. 4 is a schematic structural diagram of a slave clock according to an embodiment.

FIG. 4 is a schematic structural diagram of a slave clock according to an embodiment of the present application. Referring to FIG. 4, a slave clock 400 includes a receiving unit 401, a first determining unit 402, and a calibration unit 403. For example, the slave clock 400 may be configured to perform the method shown in FIG. 2. For example, the receiving unit 401 may be configured to perform S201. The first determining unit 402 may be configured to perform S202. The calibration unit 403 may be configured to perform S203. For meanings of technical terms related to the slave clock 400 and a specific implementation of a technical solution related to the slave clock 400, refer to the descriptions in the embodiment corresponding to the method shown in FIG. 2, and details are not described herein again. In addition, the slave clock 300 shown in FIG. 3 may implement the slave clock 400 shown in FIG. 4.

The receiving unit 401 is configured to receive a first pulse signal and a second pulse signal, where the second pulse signal is sent by a master clock after the master clock sends the first pulse signal.

For example, the receiver 301 in the slave clock 300 may be configured to implement the receiving unit 401.

The first determining unit 402 is configured to determine, based on a first phase difference, a second phase difference, a first delay, and a second delay, that a frequency offset of the slave clock relative to the master clock is equal to a first frequency offset, where the first phase difference is a difference between a phase of a third pulse signal generated by the slave clock and a phase of the first pulse signal received by the slave clock, the third pulse signal is generated by the slave clock when the slave clock receives the first pulse signal, the second phase difference is a difference between a phase of a fourth pulse signal generated by the slave clock and a phase of the second pulse signal received by the slave clock, the fourth pulse signal is generated by the slave clock when the slave clock receives the second pulse signal, the first delay is a delay that is determined by the slave clock when the slave clock receives the first pulse signal and that is of a link between the master clock and the slave clock, the first delay is determined by the slave clock based on packets exchanged between the master clock and the slave clock, the second delay is a delay that is determined by the slave clock when the slave clock receives the second pulse signal and that is of the link between the master clock and the slave clock, the second delay is determined by the slave clock based on packets exchanged between the master clock and the slave clock, and the first delay is unequal to the second delay.

For example, the central processing unit 305 may be configured to implement the first determining unit 402. The phase detector 302 may be configured to determine the first phase difference and the second phase difference. The central processing unit 305 may be configured to determine the first delay and the second delay. The pulse generator 303 may be configured to generate the third pulse signal and the fourth pulse signal.

The calibration unit 403 is configured to calibrate frequency of the slave clock based on the first frequency offset determined by the first determining unit.

For example, the central processing unit 305 and a voltage source in the slave clock 300 may be configured to implement the calibration unit 403.

Figure 5:
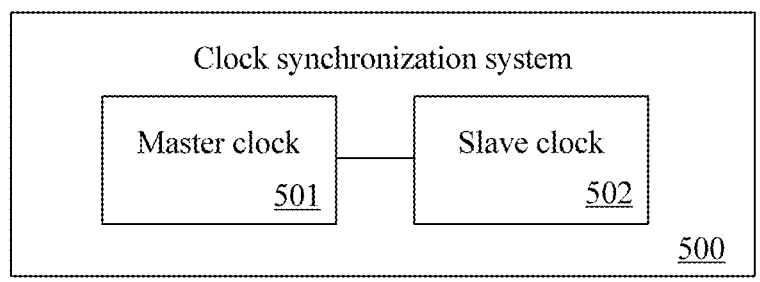
FIG. 5 is a schematic structural diagram of a clock synchronization system according to an embodiment.

FIG. 5 is a schematic structural diagram of a clock synchronization system according to an embodiment of the present application. Referring to FIG. 5, a time synchronization system 500 includes a master clock 501 and a slave clock 502. The master clock 501 and the slave clock 502 may support functions defined in the IEEE 1588-2002. The slave clock 502 may be configured to perform the method shown in FIG. 2. For example, the slave clock 502 may perform S201, S202, and S203. The master clock 501 may be the master clock in S202. For meanings of technical terms used when the slave clock 502 performs the method shown in FIG. 2 and a specific implementation of the technical solution, refer to the descriptions in the embodiment corresponding to the method shown in FIG. 2, and details are not described herein again. In addition, the slave clock 502 may be implemented by using the slave clock 400 shown in FIG. 4. For example, the slave clock 502 may include a receiving unit 401, a first determining unit 402, and a calibration unit 403. For meanings of technical terms used when the slave clock 502 is implemented by using the slave clock 400 shown in FIG. 4 and a specific implementation of the technical solution, refer to the descriptions in the embodiment corresponding to the slave clock shown in FIG. 4, and details are not described herein again.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. For each particular application, a professional technician may implement the described functions by using a different method.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division may merely be logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present application. The foregoing storage medium includes: any medium that can store program code, such as a USB flash drive, a removable hard disk, a read-only memory (ROM), a random access memory (RAM), a magnetic disk, or an optical disc.

What is claimed is:

1. A method, comprising:

receiving, by a slave clock, a first pulse signal and a second pulse signal, wherein the second pulse signal is sent by a master clock after the master clock sends the first pulse signal;

determining, by the slave clock based on a first phase difference, a second phase difference, a first delay, and a second delay, that a frequency offset of the slave clock relative to the master clock is equal to a first frequency offset, wherein the first phase difference is a difference between a phase of a third pulse signal generated by the slave clock and a phase of the first pulse signal received by the slave clock, the third pulse signal is generated by the slave clock when the slave clock receives the first pulse signal, the second phase difference is a difference between a phase of a fourth pulse signal generated by the slave clock and a phase of the second pulse signal received by the slave clock, the fourth pulse signal is generated by the slave clock when the slave clock receives the second pulse signal, the first delay is determined by the slave clock when the slave clock receives the first pulse signal, the first delay is of a link between the master clock and the slave clock, and the first delay is determined by the slave clock independently of the first pulse signal and the second pulse signal, and determined based on first packets exchanged between the master clock and the slave clock, the second delay is determined by the slave clock when the slave clock receives the second pulse signal, the second delay is of the link between the master clock and the slave clock, and the second delay is determined by the slave clock independently of the first pulse signal and the second pulse signal, and determined based on second packets exchanged between the master clock and the slave clock, and the first delay is unequal to the second delay; and calibrating, by the slave clock, a frequency of the slave clock based on the first frequency offset.

2. The method according to claim 1, wherein before determining, by the slave clock based on the first phase difference, a second phase difference, the first delay, and the second delay, that the frequency offset of the slave clock relative to the master clock is equal to the first frequency offset, the method further comprises:

determining, by the slave clock, the first delay and the second delay based on the following relations:

$$\text{Delay} = \frac{(t2-t1)+(t4-t3)}{2}, \text{ and } \text{Delay}' = \frac{(t2'-t1')+(t4'-t3')}{2};$$

and wherein t1 is a time at which the master clock sends a first packet, t2 is a time at which the slave clock receives the first packet, t3 is a time at which the slave clock sends a second packet, t4 is a time at which the master clock receives the second packet, the first packets comprise the first packet and the second packet, t1' is a time at which the master clock sends a third packet, t2' is a time at which the slave clock receives the third packet, t3' is a time at which the slave clock sends a fourth packet, t4' is a time at which the master clock receives the fourth packet, Delay is the first delay, Delay' is the second delay, and the second packets comprise the third packet and the fourth packet.

3. The method according to claim 2, wherein determining, by the slave clock based on the first phase difference, the second phase difference, the first delay, and the second delay, that the frequency offset of the slave clock relative to the master clock is equal to the first frequency offset comprises:

determining, by the slave clock, the first frequency offset based on the following relation:

$$FreqOffset = \frac{(PD - \text{Delay}) - (PD' - \text{Delay}')}{Ts};$$

and wherein PD is the first phase difference, PD' is the second phase difference, Ts is a difference between a time at which the slave clock receives the first pulse signal and a time at which the slave clock receives the second pulse signal, and FreqOffset is the first frequency offset.

4. The method according to claim 3, wherein:
the third pulse signal is generated by the slave clock after the slave clock receives the first pulse signal, and the fourth pulse signal is generated by the slave clock after the slave clock receives the second pulse signal; or
the third pulse signal is generated by the slave clock before the slave clock receives the first pulse signal, and the fourth pulse signal is generated by the slave clock before the slave clock receives the second pulse signal.

5. The method according to claim 3, wherein:
the first packet is a synchronization (Sync) message, and the second packet is a delay request (Dela_req) message; or
the first packet is a Network Time Protocol (NTP) response packet, and the second packet is an NTP request packet.

6. The method according to claim 2, wherein:
the third pulse signal is generated by the slave clock after the slave clock receives the first pulse signal, and the fourth pulse signal is generated by the slave clock after the slave clock receives the second pulse signal; or
the third pulse signal is generated by the slave clock before the slave clock receives the first pulse signal, and the fourth pulse signal is generated by the slave clock before the slave clock receives the second pulse signal.

7. The method according to claim 2, wherein:
the first packet is a synchronization (Sync) message, and the second packet is a delay request (Delay_req) message; or
the first packet is a Network Time Protocol (NTP) response packet, and the second packet is an NTP request packet.

8. The method according to claim 1, wherein:
the third pulse signal is generated by the slave clock after the slave clock receives the first pulse signal, and the fourth pulse signal is generated by the slave clock after the slave clock receives the second pulse signal; or
the third pulse signal is generated by the slave clock before the slave clock receives the first pulse signal, and the fourth pulse signal is generated by the slave clock before the slave clock receives the second pulse signal.

9. A slave clock, comprising:
a receiver, configured to receive a first pulse signal and a second pulse signal, wherein the second pulse signal is sent by a master clock after the master clock sends the first pulse signal;
a processor; and
a computer-readable storage medium storing a program to be executed by the processor, the program including instructions for:
determining, based on a first phase difference, a second phase difference, a first delay, and a second delay, that a frequency offset of the slave clock relative to the master clock is equal to a first frequency offset, wherein the first phase difference is a difference between a phase of a third pulse signal generated by the slave clock and a phase of the first pulse signal received by the slave clock, the third pulse signal is generated by the slave clock when the slave clock receives the first pulse signal, the second phase difference is a difference between a phase of a fourth pulse signal generated by the slave clock and a phase of the second pulse signal received by the slave clock, the fourth pulse signal is generated by the slave clock when the slave clock receives the second pulse signal, the first delay is determined by the slave clock when the slave clock receives the first pulse signal, the first delay is of a link between the master clock and the slave clock, and the first delay is determined by the slave clock independently of the first pulse signal and the second pulse signal, and determined based on first packets exchanged between the master clock and the slave clock, the second delay is determined by the slave clock when the slave clock receives the second pulse signal, the second delay is of the link between the master clock and the slave clock, and the second delay is determined by the slave clock independently of the first pulse signal and the second pulse signal, and determined based on second packets exchanged between the master clock and the slave clock, and the first delay is unequal to the second delay; and
calibrating a frequency of the slave clock based on the first frequency offset.

10. The slave clock according to claim 9, wherein the program includes instructions for:
before determining that the frequency offset of the slave clock relative to the master clock is equal to the first frequency offset, determining the first delay and the second delay based on the following relations:

$$\text{Delay} = \frac{(t2 - t1) + (t4 - t3)}{2}, \text{ and } Delay' = \frac{(t2' - t1') + (t4' - t3')}{2};$$

and wherein t1 is a time at which the master clock sends a first packet, t2 is a time at which the slave clock receives the first packet, t3 is a time at which the slave clock sends a second packet, t4 is a time at which the master clock receives the second packet, the first packets comprise the first packet and the second packet, t1' is a time at which the master clock sends a third packet, t2' is a time at which the slave clock receives the third packet, t3' is a time at which the slave clock sends a fourth packet, t4' is a time at which the master clock receives the fourth packet, Delay is the first delay, Delay' is the second delay, and the second packets comprise the third packet and the fourth packet.

11. The slave clock according to claim 10, wherein: the third pulse signal is generated by the slave clock after the slave clock receives the first pulse signal, and the fourth pulse signal is generated by the slave clock after the slave clock receives the second pulse signal.

12. The slave clock according to claim 10, wherein the third pulse signal is generated by the slave clock before the slave clock receives the first pulse signal, and the fourth pulse signal is generated by the slave clock before the slave clock receives the second pulse signal.

13. The slave clock according to claim 10, wherein the first packet is a synchronization (Sync) message, and the second packet is a delay request (Delay_req) message.

14. The slave clock according to claim 10, wherein the first packet is a Network Time Protocol (NTP) response packet, and the second packet is an NTP request packet.

15. The slave clock according to claim 10, wherein the program includes instructions for determining the first frequency offset based on the following relation:

$$FreqOffset = \frac{(PD - \text{Delay}) - (PD' - \text{Delay}')}{Ts};$$

and
wherein PD is the first phase difference, PD' is the second phase difference, Ts is a difference between a time at which the slave clock receives the first pulse signal and a time at which the slave clock receives the second pulse signal, and FreqOffset is the first frequency offset.

16. The slave clock according to claim 15, wherein the third pulse signal is generated by the slave clock after the slave clock receives the first pulse signal, and the fourth pulse signal is generated by the slave clock after the slave clock receives the second pulse signal.

17. The slave clock according to claim 15, wherein the third pulse signal is generated by the slave clock before the slave clock receives the first pulse signal, and the fourth pulse signal is generated by the slave clock before the slave clock receives the second pulse signal.

18. The slave clock according to claim 15, wherein the first packet is a synchronization (Sync) message, and the second packet is a delay request (Delay_req) message.

19. The slave clock according to claim 15, wherein the first packet is a Network Time Protocol (NTP) response packet, and the second packet is an NTP request packet.

20. The slave clock according to claim 9, wherein:
the third pulse signal is generated by the slave clock after the slave clock receives the first pulse signal, and the fourth pulse signal is generated by the slave clock after the slave clock receives the second pulse signal; or
the third pulse signal is generated by the slave clock before the slave clock receives the first pulse signal, and the fourth pulse signal is generated by the slave clock before the slave clock receives the second pulse signal.

* * * * *

UNITED STATES PATENT AND TRADEMARK OFFICE
CERTIFICATE OF CORRECTION

PATENT NO. : 11,038,608 B2
APPLICATION NO. : 16/401996
DATED : June 15, 2021
INVENTOR(S) : Jingfei Lv Page 1 of 1

It is certified that error appears in the above-identified patent and that said Letters Patent is hereby corrected as shown below:

In the Claims

Claim 5, Column 17; Line 36 delete "(Dela_req)" insert --(Delay_req)--

Signed and Sealed this
Seventh Day of September, 2021

Drew Hirshfeld
*Performing the Functions and Duties of the
Under Secretary of Commerce for Intellectual Property and
Director of the United States Patent and Trademark Office*